United States Patent Office 2,884,385
Patented Apr. 28, 1959

---

2,884,385

PROCESS FOR MAKING A SPONGE-LIKE INSULATING MATERIAL FROM TEXTILE SCRAPS AND PRODUCT RESULTING THEREFROM

Liselotte Sauer, Bad Hersfeld, Germany

No Drawing. Application April 12, 1955
Serial No. 501,005

Claims priority, application Germany April 20, 1954

5 Claims. (Cl. 260—2.5)

The present invention relates to a process for making a sponge-like insulating material from textile scraps.

As starting materials inexpensive scrap materials are used, more particularly textile materials made from polyamides and wool. The process itself is very simple and useful, products can therefore be made in a very inexpensive manner.

It is known to make sponge-like products, or so-called foam rubber, from rubber latex with the aid of gases or gas-releasing substances which act as expanding means, the blown-up products being thereafter vulcanized.

Gas-releasing reactions were, however, only used experimentally without having so far been very successful in the production of foam rubber.

Other known processes relating to the production of plastics with cellular structure use gases or vapors, yet others solid substances, which are afterwards removed by dissolving them; also employed were melted plastics having distributed therein substances that evaporate or release gases when heated. The plastics may for similar purposes also be applied in solutions or emulsions.

None of the above mentioned attempts have been entirely successful. It has now been found that the inconveniences entailed by the known processes can be overcome, according to the present invention, by dissolving the starting materials, i.e. the textile scraps above described, in a strong acid and exposing the solution in thin layers to the action of alkali metal carbonate solutions.

Acids to be used in the process according to the invention are, first of all, hydrochloric acid, and next in usefulness formic acid. While it is possible to use nitric or sulfuric acid, they are less satisfactory because they attack the fibers and yield products having some less desirable properties.

Processes using strong acids for dissolving the textile materials did not yield any useful results before, because, when the synthetic material is brought together with the acid and the carbonate, without particular measures being taken, there will only be local reactions with irregular foam formation in the synthetic used, so that the products obtained will likewise be uneven and unsatisfactory.

In carrying out the process according to the invention, I use, e.g. scraps of wool (in the form of dust, shorn hair, and similar waste products) which are hydrolyzed with conc. hydrochloric acid at raised temperature of about 100° C., while stirring, until a thick liquid is obtained. Preferably the ratio of reactants is 2.3 of hydrochloric acid of a density of 1.15:1 part of wool, parts being by weight.

The mass is cooled and added to a HCl solution of a soluble textile scrap, of a polyamide material, such as used under the trade names of "nylon" or "Perlon." In this case, too, the ratio is 2.3 parts of HCl of the above density: 1 part of starting material, parts being by weight. When less acid is used, the material will not dissolve properly; when, on the other hand, a larger amount of acid is used, the solution will become too thin. The solution has to be strained before it is mixed with the woolen mass, in order to remove undissolved particles (of cotton or rayon threads, and the like). The ratio of wool to polyamide fibers is preferably 1:2.

The mixture is spread on a smooth plate or similar support in a layer of 1–3 mm. thickness, preferably of 0.8 to 1.2 mm., and is then steeped in soda solution. At this point, the mass will froth and will expand to about 10 to 15 times its original volume.

It is advantageous to arrange during the steeping process a wire net or a perforated plate of earthenware, or the like, at a distance of 1 to 3 cm. above the reaction mass, the exact distance depending on the thickness of the spread layer and the desired end product, in order to prevent too much of an expansion during the foaming; also for preventing that the mass becomes too porous.

The minimum concentration of the soda solution should be 0.1 mol per liter; a concentration of 1 mol per liter is the most desirable.

Sponge formation occurs already in the cold, when a sufficiently high concentration of the soda solution, about 30 g. per liter, is used. In this manner of procedure, the sponge will adhere to the supporting plate and the solution does not react evenly and completely, so that occlusions of non-reacted solution will be present. It is, therefore, preferable to carry out the operation while heating, but temperatures above 90° C. should be avoided, since at this temperature the reaction becomes too turbulent and the sponge formed will be uneven. The best result is obtained with a soda solution of 1 mol at a temperature of about 75° C. The material, which is now in a precipitated state, is washed and freed from adherent washing water by drying. The product is then ready for use.

Instead of, or in addition to, wool it is possible to use a solution of comminuted glasswool or stonewool or the like, in finely distributed state, as an admixture to the solution of the polyamide fibers in solution. The polyamide solution may also be processed without further addition of a wool solution or other substances. If the polyamide solution is used without admixtures, sponge formation will be slightly delayed and will occur preferably at temperatures from about 80° to about 100° C. In the cold or at moderately raised temperature, a solid skin will first form. However, it is possible by gently lifting the skin, to initiate a reaction of the underlying solution, so that even at low temperatures the reaction of sponge formation can be carried out satisfactorily.

According to another modification the solution may be spread, with or without admixtures, on paper or another suitable carrier and then reacted as described before. The resulting sponge adheres strongly to the carrier, even after washing, so that a novel product is formed in this manner.

Yet, another modification consists in applying the finished dry sponge onto a support, for instance by gluing, or the like. When working in this manner, it may be advantageous slightly to moisten the carrier with concentrated HCl and press the material thereon, the union being effected by slight dissolution of the compound before being joined to the carrier.

The invention will now be more fully described by way of examples, but it should be understood that these are given by way of illustration and not of limitation and that many changes can be made in the details without departing from the spirit of the invention.

Parts, where not otherwise stated, are by weight.

*Example 1*

1 part of polyamide fiber scrap is dissolved in the cold in 2.3 parts of hydrochloric acid, density 1.15. The undissolved particles (cotton or rayon threads, or the like) are removed by straining through a sieve. The highly viscous solution is spread on a glass plate in a layer of 0.8–1.2 mm., and steeped into a soda solution containing about one mol and heated to 80–100° C. During the steeping process, a wire net is arranged above the support in a distance corresponding to the desired thickness of the insulating material to be obtained; the distance is about 10–15 mm. Instead of the wire net, I may also use a perforated plate of earthenware. Time of reaction 5–10 minutes by a viscosity of initial solution of about 20,000 cp.

The sponge-like material formed in the reaction is washed and dried.

*Example 2*

I part of woolen scrap (in the form of dust, shorn hair, and similar material) is partly hydrolized with 2.3 parts of hydrochloric acid (density 1.15) at 100° C., until a mass of high viscosity is formed as described in Example 1. (The reaction takes about 15–20 minutes.) After cooling to room temperature, the wool solution is mixed with the strained nylon solution in the ratio 1:2. Further processing is done as described in Example 1, by reacting the mass obtained with 1 molar soda solution at a temperature of about 75° C. for about 4–8 minutes.

The sponge-like material is washed and dried.

*Example 3*

One part of polyamide scrap is mixed with 3 parts of formic acid of 85%. The process is carried out as described in Example 1. The temperature of the carbonate solution being maintained at 85° C. the time of reaction being 5–7.

What I claim is:

1. A process for making sponge-like heat and sound insulating material from polyamide scrap which comprises dissolving polyamide material in a concentrated acid selected from the group consisting of hydrochloric acid and formic acid, spreading the solution in a layer of up to 3 mm. thickness on a carrier plate, and treating the same with an alkali carbonate solution while placing over said layer a wire net spaced substantially parallel from the surface of said layer at a distance of from 1 to 3 cm. to determine the final thickness, and to prevent over-expansion of the sponge-like material to be formed, thereby expanding said layer to a coherent sponge-like structure which then is washed and dried.

2. A process for making sponge-like heat and sound insulating material from polyamide scrap which comprises dissolving one part of said polyamide in 2.3 parts of a concentrated acid selected from the group consisting of hydrochloric acid of a density of 1.15 and formic acid, spreading the solution in a layer of up to 3 mm. thickness on a carrier plate, and treating the same with a sodium carbonate solution containing approximately 1 mol $Na_2CO_3$ at a temperature of 75 to 100° C. while placing over said layer a wire net spaced substantially parallel from the surface of said layer at a distance of from 1 to 3 cm. to determine the final thickness, and to prevent over-expansion of, the sponge-like material to be formed, thereby expanding said layer to a coherent sponge-like structure which then is washed and dried.

3. The process according to claim 2, wherein the thickness of the layer of said solution is 0.8 to 1.2 mm.

4. A process of making a sponge-like material from textile scraps, comprising acid-hydrolizing material selected from the group consisting of wool, glass wool and stone wool, at an elevated temperature ranging from 75 to 100° C., the ratio of the textile scraps to the acid being 1:2.3; cooling the resultant product to room temperature; adding a dissolved polyamide fiber solution obtained by treating one part of said polyamide fiber in 2.3 parts of concentrated acid, in a ratio of one part by weight of the material selected from the above group to two parts of the polyamide fiber solution, to thereby obtain a viscous solution; spreading a thin layer of said viscous solution on a carrier plate, contacting the layer with a soda solution containing approximately 1 mol sodium carbonate which is heated to a temperature of 75–100° C., and finally washing and drying the resulting material.

5. As an article of manufacture a foamed cellular sponge-like material usable as heat and sound insulation, consisting substantially of one part of acid-hydrolized wool and two parts of acidified polyamide material.

References Cited in the file of this patent

UNITED STATES PATENTS

| | | |
|---|---|---|
| 2,085,052 | Taylor | June 29, 1937 |
| 2,268,160 | Miles | Dec. 30, 1941 |
| 2,730,479 | Gibson | Jan. 10, 1956 |
| 2,744,291 | Stastny et al. | May 8, 1956 |
| 2,779,062 | Stastny | May 8, 1956 |

FOREIGN PATENTS

| | | |
|---|---|---|
| 21,560 | Great Britain | of 1910 |
| 670,693 | Great Britain | Apr. 23, 1952 |